ус009221001B2

(12) United States Patent
Horiuchi

(10) Patent No.: US 9,221,001 B2
(45) Date of Patent: Dec. 29, 2015

(54) OIL MIST SEPARATOR

(75) Inventor: Yoji Horiuchi, Aichi (JP)

(73) Assignee: TOYOTA BOSHOKU KABUSHIKI KAISHA, Aichi (JP)

( * ) Notice: Subject to any disclaimer, the term of this patent is extended or adjusted under 35 U.S.C. 154(b) by 79 days.

(21) Appl. No.: 14/123,670

(22) PCT Filed: Jul. 19, 2012

(86) PCT No.: PCT/JP2012/068391
§ 371 (c)(1),
(2), (4) Date: Dec. 3, 2013

(87) PCT Pub. No.: WO2013/054578
PCT Pub. Date: Apr. 18, 2013

(65) Prior Publication Data
US 2014/0109533 A1  Apr. 24, 2014

(30) Foreign Application Priority Data

Oct. 11, 2011 (JP) ................. 2011-224168

(51) Int. Cl.
| F01M 13/00 | (2006.01) |
| B01D 45/08 | (2006.01) |
| B01D 46/00 | (2006.01) |
| F01M 13/04 | (2006.01) |

(52) U.S. Cl.
CPC ............ B01D 45/08 (2013.01); B01D 46/0089 (2013.01); F01M 13/04 (2013.01); *F01M 2013/0433* (2013.01); *F01M 2013/0461* (2013.01); *F01M 2013/0488* (2013.01)

(58) Field of Classification Search
CPC .................. F01M 13/0416; F01M 2013/0461; F01M 2013/0433; F02B 25/06; B01D 45/08; B01D 46/0089

USPC ............ 55/423, 443, 444, 462, 466, DIG. 19; 123/41.86, 198 E, 572, 573
See application file for complete search history.

(56) References Cited

U.S. PATENT DOCUMENTS

| 4,627,406 A | * | 12/1986 | Namiki et al. ................. 123/573 |
| 2007/0215128 A1 | * | 9/2007 | Yonebayashi et al. ........ 123/572 |

(Continued)

FOREIGN PATENT DOCUMENTS

| CN | 101954227 A | 1/2011 |
| EP | 2275651 A1 | 1/2011 |

(Continued)

OTHER PUBLICATIONS

WIPO International Search Report dated Sep. 25, 2012 for PCT/JP2012/068391.

(Continued)

*Primary Examiner* — Duane Smith
*Assistant Examiner* — Minh-Chau Pham
(74) *Attorney, Agent, or Firm* — Greenblum & Bernstein, P.L.C.

(57) ABSTRACT

An oil mist separator includes: a separator body having a gas flow path; a gas introduction part introducing the blow-by gas into the separator body; a gas discharge part discharging the blow-by gas from the separator body; a separation unit separating oil from the blow-by gas; dams provided on the bottom wall of the separator body downstream of the separation unit in the gas flow path and configured to block the oil separated from flowing to the downstream side; and an oil discharge part provided upstream of the dams in the gas flow path and configured to discharge the oil separated from the separator body, wherein the dams are formed along the gas flow path so as to alternately extend from the pair of side walls, and the dams extend such that tip ends of the dams are located beyond a center of the gas flow path.

10 Claims, 6 Drawing Sheets

(56) References Cited

U.S. PATENT DOCUMENTS

| | | |
|---|---|---|
| 2008/0127953 A1 | 6/2008 | Shieh et al. |
| 2009/0038579 A1 | 2/2009 | Shieh et al. |
| 2010/0126479 A1* | 5/2010 | Shieh et al. .................. 123/573 |
| 2015/0096510 A1* | 4/2015 | Wall et al. .................. 123/41.86 |

FOREIGN PATENT DOCUMENTS

| | | |
|---|---|---|
| JP | 2000-310109 | 11/2000 |
| JP | 2004-360474 | 12/2004 |
| JP | 2006-336495 | 12/2006 |
| JP | 2010-511827 | 4/2010 |
| JP | 2010-248935 | 11/2010 |
| WO | 2008-070514 | 6/2008 |

OTHER PUBLICATIONS

Chinese Office Action in counterpart Chinese Application No. 201280037021.X, dated Jul. 7, 2015, and English translation.

* cited by examiner

OIL MIST SEPARATOR

TECHNICAL FIELD

The present invention relates to an oil mist separator. In particular, the present invention relates to an oil mist separator capable of suppressing separated oil from moving along a bottom surface toward a gas outlet.

BACKGROUND ART

A PCV (positive crankcase ventilation) system by which blow-by gas leaking from a combustion chamber of an internal combustion engine into a crankcase through a gap between a piston and a cylinder is introduced into an induction system has been conventionally known. The PCV system sends the blow-by gas as incomplete combustion gas into the combustion chamber again, thereby preventing emission of fuel components and carbon monoxide in the blow-by gas into air.

However, the blow-by gas contains an oil component for lubricating the internal combustion engine in mist form, and when the blow-by gas containing the oil component is burnt, disadvantageously, the amount of lubricating oil decreases, and white smoke occurs due to combustion of the oil component. Thus, an oil mist separator is provided in the PCV system to separate the mist oil from the blow-by gas (Refer to, for example, Patent Document 1).

Patent Document 1: JP 2000-310109 A

SUMMARY OF THE INVENTION

Problems to be Solved by the Invention

In Patent Document 1, a plurality of guide plates are diagonally erected on the bottom surface of a breather chamber for flowing blow-by gas in order to make a labyrinth-like gas passage, and the blow-by gas is passed through the gas passage to separate oil. The separated oil is discharged from oil escaping holes located upstream of the respective guide plates. To accumulate oil in front of the guide plates to increase the oil collecting efficiency, the bottom surface of the breather chamber is inclined to be lower toward the downstream side of the gas passage. For this reason, disadvantageously, the separated oil easily moves along the bottom surface and flows toward a gas outlet.

Further, in Patent Document 1, tip ends of the guide plates provided near one side wall extend toward the downstream side of the gas passage. Accordingly, oil in front of these guide plates cannot be blocked by the guide plates and thus, easily flows toward the gas outlet.

The present invention is made in consideration of the present circumstances, and intends to provide an oil mist separator capable of suppressing separated oil from moving along the bottom surface toward the gas outlet.

Means for Solving the Problems

To solve the problems above, the invention described in Claim 1 is an oil mist separator for separating mist oil contained in blow-by gas from an internal combustion engine, the oil mist separator which is summarized that including:

a separator body which includes a bottom wall and a pair of side walls erected from sides of the bottom wall and has a gas flow path through which the blow-by gas flows;

a gas introduction part configured to introduce the blow-by gas into the separator body;

a gas discharge part configured to discharge the blow-by gas from the separator body;

a separation unit provided between the gas introduction part and the gas discharge part in the separator body and configured to separate oil from the blow-by gas;

dams provided on the bottom wall of the separator body downstream of the separation unit in the gas flow path and configured to block the oil separated by the separation unit from flowing to the downstream side; and an oil discharge part provided upstream of the dams in the gas flow path and configured to discharge the oil separated by the separation unit from the separator body, wherein the dams are formed along the gas flow path so as to alternately extend from the pair of side walls, and the dams extend such that tip ends of the dams are located beyond a center of the gas flow path in a width direction and upstream of base ends of the dams.

In embodiments, an upper end surface of each of the dams is inclined downward from the base end toward the tip end.

In embodiments, an upper end surface of the tip end has a notch.

In embodiments, an oil storage part is formed at one end of the separator body near the gas discharge part.

Effects of the Invention

An oil mist separator according to the present invention includes: a separator body which includes a bottom wall and a pair of side walls erected from sides of the bottom wall and has a gas flow path through which the blow-by gas flows; a gas introduction part configured to introduce the blow-by gas into the separator body; and a gas discharge part configured to discharge the blow-by gas from the separator body. The oil mist separator also includes: a separation unit provided between the gas introduction part and the gas discharge part in the separator body and configured to separate oil from the blow-by gas; dams provided on the bottom wall of the separator body downstream of the separation unit in the gas flow path and configured to block the oil separated by the separation unit from flowing to the downstream side; and an oil discharge part provided upstream of the dams in the gas flow path and configured to discharge the oil separated by the separation unit from the separator body. The dams are formed along the gas flow path so as to alternately extend from the pair of side walls. With such configuration, even when oil blocked by any dam overflows from the dam, the subsequent downstream dam can block the oil. As a result, the separated oil can be suppressed from moving along the surface of the bottom wall and flowing toward the gas outlet. Further, since the dams extend such that tip ends of the dams are located beyond a center of the gas flow path in a width direction and upstream of base ends of the dams, the oil blocking function of the dams can be effectively achieved. Moreover, the dams can suppress flow of the blow-by gas near the bottom wall of the separator body, preventing oil from being brought to the downstream side by the flow of the blow-by gas.

In the case where the upper end surface of each dam is inclined from its base end toward its tip end, the flow rate of the blow-by gas in the center of the gas flow path in the width direction can be ensured. Further, the blocked oil can be suppressed from overflowing from the base end of the dam to cause to overflow in the vicinity of the tip end of the dam. Thus, the subsequent downstream dam can reliably block the overflown oil. In the case where the oil mist separator is inclined to be lower toward the downstream side of the gas flow path, or an inertia force in the downstream direction of the gas flow path occurs, since the tip ends of the dams are located upstream of the base ends of the dams, the blocking capacity of the dams can be ensured as in the case where the height of the tip ends of the dams is the same as that of the base ends of the dams. Therefore, the oil mist separator can ensure both the flow rate of the blow-by gas and the oil blocking capacity.

In the case where the upper end surface of the tip end has a notch, the notch can be located at a position where the blocked oil overflows from the dam. Thereby, overflown oil can be blocked by the subsequent downstream dam more reliably, suppressing oil from flowing to the gas discharge part more effectively.

In the case where an oil storage part is formed at one end of the separator body near the gas discharge part, oil that moves along the surface of the bottom wall of the separator body and reaches the vicinity of the gas discharge part can be stored in the oil storage part. As a result, separated oil can be suppressed from flowing out of the gas discharge part.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings.

MODE FOR CARRYING OUT THE INVENTION

Figure 1:
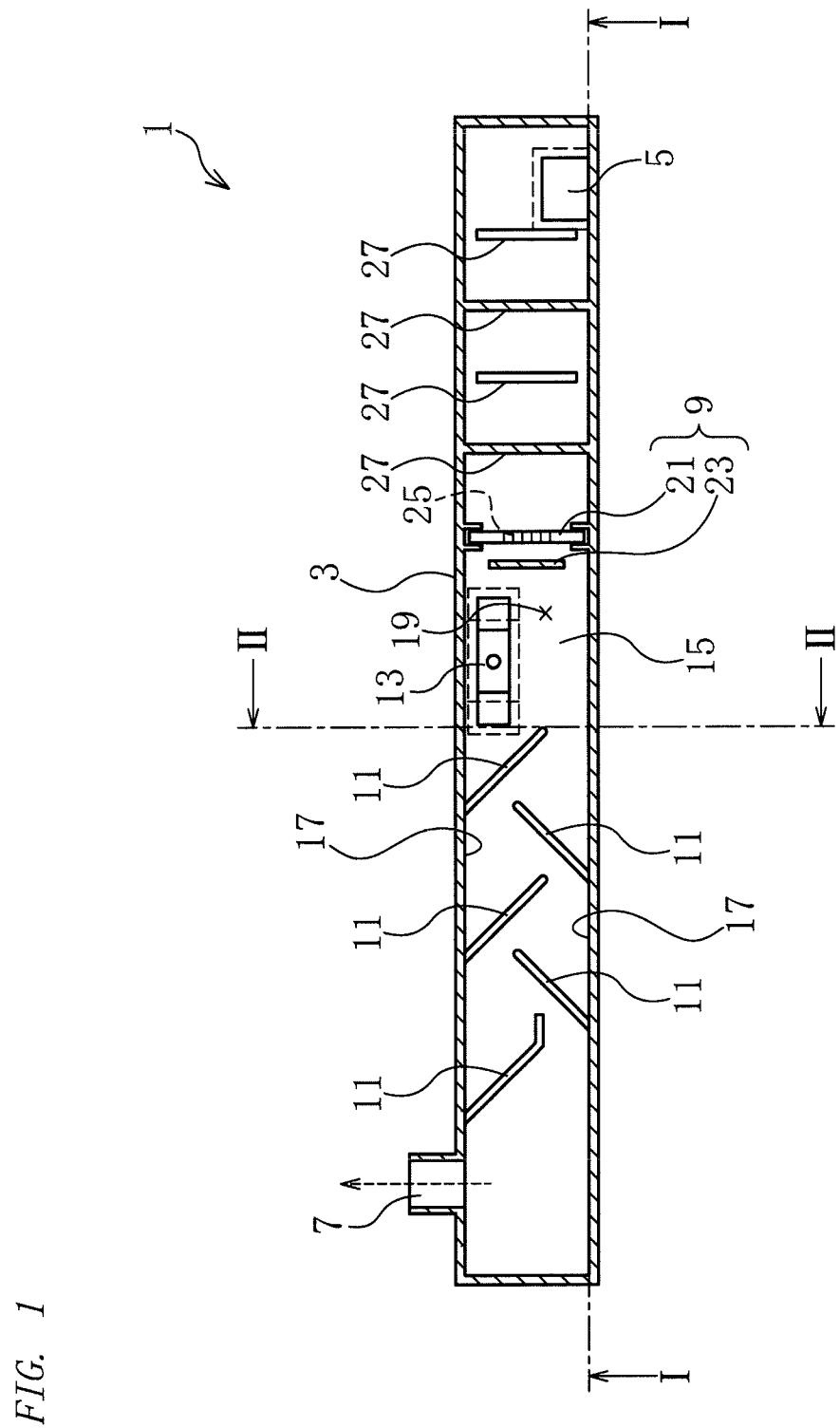
FIG. 1 is a cross-section view of an oil mist separator in accordance with an embodiment.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description is taken with the drawings making apparent to those skilled in the art how the forms of the present invention may be embodied in practice.

An oil mist separator (1) in accordance with this embodiment is an oil mist separator for separating mist oil contained in blow-by gas from an internal combustion engine, and includes a separator body (3), a gas introduction part (5), a gas discharge part (7), a separation unit (9), dams (11), and an oil discharge part (13), described hereinafter.

As long as the "separator body" includes a bottom wall (15) and a pair of side walls (17) erected from sides of the bottom wall, and has a gas flow path (19) through which the blow-by gas flows, a structure, a shape, a material, and the like of the separator body are not limited.

As long as the "gas introduction part" is configured to introduce the blow-by gas into the separator body, a shape, an arrangement, and the like of the gas introduction part are not limited. The gas introduction part is preferably provided on the bottom wall of the separator body. This is because the separated oil is accumulated on the bottom wall of the separator body, and the oil can be flown out of the gas introduction part, returning to an oil storage part of the internal combustion engine.

As long as the "gas discharge part" is configured to discharge the blow-by gas from the separator body, a shape, an arrangement, and the like of the gas discharge part are not limited. The gas discharge part is preferably provided above the bottom wall of the separator body with a distance. This is because the oil that moves along the bottom wall and reaches the downstream side of the gas flow path can be suppressed from being discharged from the gas discharge part.

As long as the "separation unit" is provided between the gas introduction part and the gas discharge part in the separator body and is configured to separate oil from the blow-by gas, a structure, a shape, a material, and the like of the separation unit are not limited. For example, the separation unit is configured to (i) include a current plate (21) provided in the gas flow path so as to block flow of the blow-by gas, and a collision plate (23) provided opposite to the current plate and downstream of the current plate, the current plate having a through hole (25), and the blow-by gas passing through the through hole to collide with the collision plate (Refer to, for example, FIGS. 1 and 2), or is configured to (ii) include a plurality of baffle plates (27) provided so as to cause blow-by gas to meander (Refer to, for example, FIGS. 1 and 2). The separation unit may be a unit, filter, or the like using a centrifugal force. A single separation unit may be used, or a plurality of separation unit of different modes may be provided or combined parallel to flow of the blow-by gas.

As long as the "dams" are provided on the bottom wall of the separator body downstream of the separation unit in the gas flow path, and is configured to block the oil separated by the separation unit from flowing to the downstream side, a structure, a shape, a material, and the like of the dams are not limited. The dams are formed along the gas flow path so as to alternately extend from the pair of side walls of the separator body. The dams extend such that tip ends of the dams are located beyond a center of the gas flow path in a width direction and upstream of base ends of the dams (Refer to, for example, FIG. 1).

Figure 2:
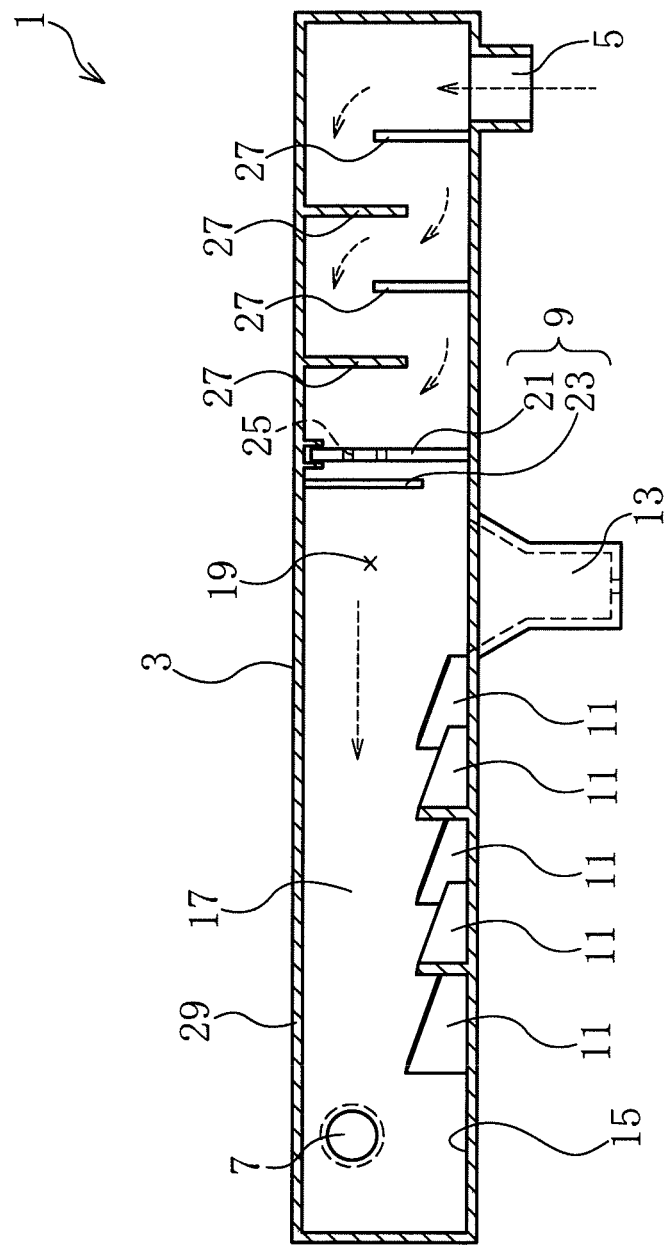
FIG. 2 is a sectional view taken along a line I-I in FIG. 1.
Figure 3:
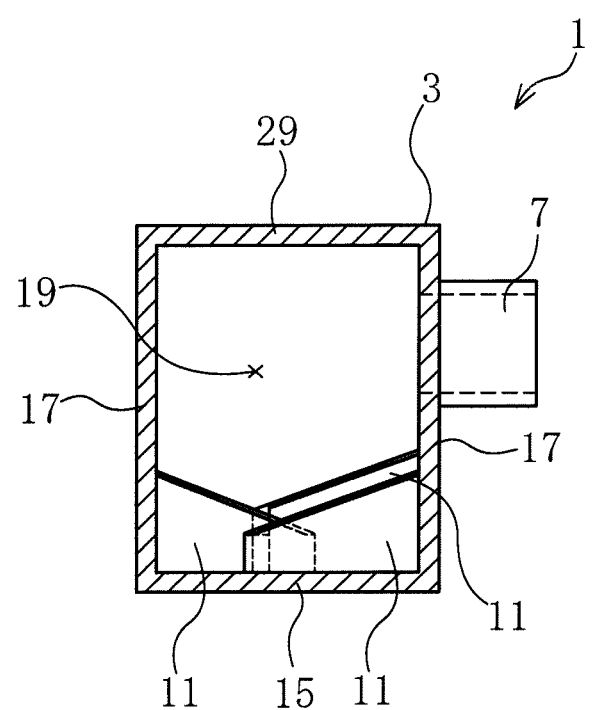
FIG. 3 is an enlarged view of a cross section taken along a line II-II in FIG. 1.

For example, an upper end surface of each of the dams is inclined downward from the base end toward the tip end (Refer to, for example, FIGS. 2 and 3). This inclination can be set to an angle at which the blocked oil reliably overflows from the tip end side in consideration of the assumed inclination angle (θ) of the oil mist separator itself and the inertia force (Refer to, for example, FIG. 4). The upper end surface of the tip end of each dam may have a notch (31) (Refer to, for example, FIG. 6). A shape, a size, and the like of the notch are not limited. For example, the dam may have a hook-like tip end extending in the upstream direction of the gas flow path (Refer to, for example, FIG. 1).

As long as the "oil discharge part" is provided upstream of the dams in the gas flow path, and discharges the oil separated by the separation unit from the separator body, a structure, a shape, a material, and the like of the oil discharge part are not limited. For example, the oil discharge part may be shaped like a tube extending downward from the bottom wall of the separator body. For example, the oil discharge part may be provided with a backflow check valve.

Figure 5:
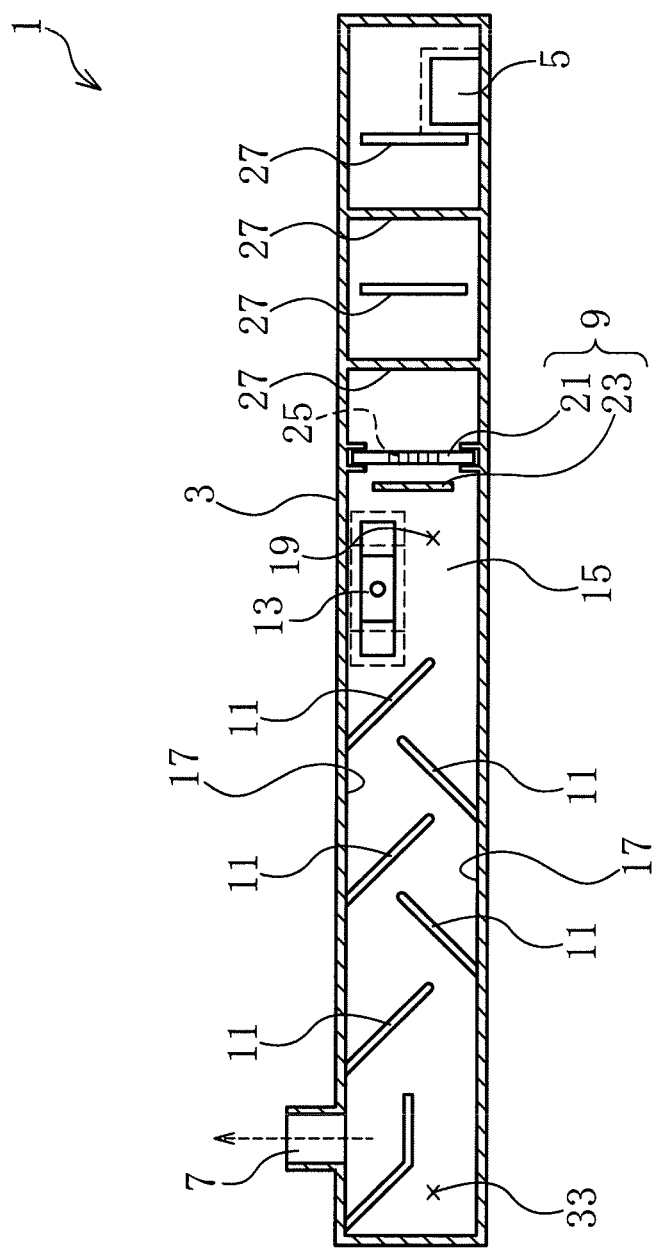
FIG. 5 is a view for describing an oil mist separator in accordance with another embodiment.

In the oil mist separator in this embodiment, for example, an oil storage part (33) may be formed at one end of the separator body near the gas discharge part (Refer to, for example, FIG. 5). The mode of the oil storage part is not limited.

Embodiments

Embodiments of the present invention will be specifically described below with reference to figures. In this embodiment, an oil mist separator mounted in a vehicle internal combustion engine is exemplified.

(1) Configuration of the Oil Mist Separator

An oil mist separator 1 in accordance with this embodiment is an oil mist separator for separating mist oil contained in blow-by gas from an internal combustion engine. As shown in FIGS. 1 to 3, the oil mist separator 1 includes a separator body 3, a gas introduction part 5, a gas discharge part 7, a separation unit 9, dams 11, and an oil discharge part 13.

The separator body 3 is substantially shaped like a square tube including a bottom wall 15 and a pair of side walls 17 erected from sides of the bottom wall 15. A space inside the separator body 3 acts as a gas flow path 19 through which the blow-by gas flows. The gas introduction part 5 is provided on the bottom wall 15 at one end of the separator body 3. The gas introduction part 5 is connected to a crankcase of the internal combustion engine (not shown), and the blow-by gas in the crankcase is introduced into the separator body 3. The gas discharge part 7 is provided on the side wall 17 at an end on the opposite side to the end at which the gas introduction part 5 is provided to discharge the blow-by gas in the separator body 3 to an induction pipe. With such configuration, the blow-by gas is introduced from the gas introduction part 5 into the separator body 3, and is discharged from the gas discharge part 7 to the outside of the separator body 3 through the gas flow path 19.

The separation unit 9 is provided between the gas introduction part 5 and the gas discharge part 7 in the separator body 3. As shown in FIGS. 1 and 2, the separation unit 9 includes a current plate 21 and a collision plate 23. The current plate 21 is provided in the gas flow path 19 so as to erect from the bottom wall 15 of the separator body 3 to block flow of the blow-by gas, and the wall surface has a plurality of through holes 25. The collision plate 23 is provided on the downstream side of the current plate 21 so as to face to the current plate 21.

In this embodiment, a plurality of baffle plates 27 are provided on the upstream side of the gas flow path 19 of the separation unit 9 (hereinafter referred to as merely upstream side). The baffle plates 27 are provided along the gas flow path 19 so as to alternately extend from the bottom wall 15 and a ceiling wall 29 of the separator body 3. The baffle plates 27 cause the blow-by gas to meander, thereby separating oil from the blow-by gas. That is, the plurality of baffle plates 27 also functions as separation unit. As shown in FIGS. 1 and 2, among the plurality of baffle plates 27, the baffle plates 27 extending from the ceiling wall 29 are connected to the separator body 3 at the ceiling wall 29 and both the side walls 17. Among the plurality of baffle plates 27, the baffle plates 27 extending from the bottom wall 15 are connected to the separator body 3 at the bottom wall 15. That is, the baffle plates 27 extending from the bottom wall 15 are not connected to both the side walls 17, and the baffle plates 27 extending from the bottom wall 15 and both the side walls 17 have a gap therebetween. This prevents separated oil from accumulating between the baffle plates 27 extending from the bottom wall 15.

Figure 4:
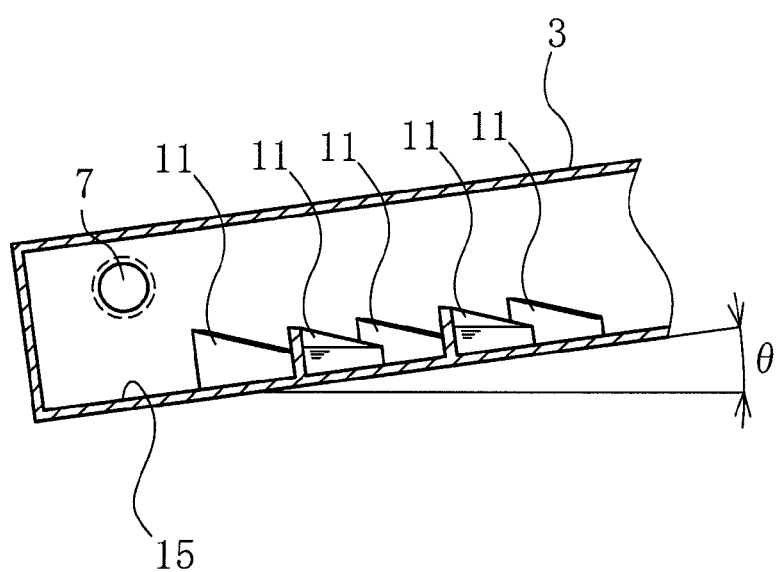
FIG. 4 is a view for describing the action of the oil mist separator in accordance with the embodiment.

The dams 11 are provided on the bottom wall 15 of the separator body 3 downstream of the separation unit 9 in the gas flow path 19 to prevent the oil separated by the separation unit 9 from moving along the bottom wall 15 and flowing to the downstream side. The dams 11 are provided along the gas flow path 19 so as to alternately extend from the pair of side walls 17 of the separator body 3. Each of the dams 11 extends such that the tip end of the dam is located beyond the center of the gas flow path 19 in a width direction and upstream of the base end of the dam in the gas flow path 19. In this embodiment, an upper end surface of each of the dams 11 is inclined downward from the base end toward the tip end. As shown in FIG. 4, in consideration of inclination and inertia force assumed to occur during driving of the vehicle, this inclination angle is set to an angle at which oil overflows from the tip ends of the dams 11 even when the oil mist separator 1 is inclined at an angle θ or the inertia force corresponding to the angle acts. Among the plurality of dams 11, the dam 11 located on the most downstream side has a hook-like tip end extending in the upstream direction of the gas flow path 19.

The oil discharge part 13 is provided upstream of the dams 11 in the gas flow path 19. The oil discharge part 13 is shaped like a tube extending downward from the bottom wall 15 of the separator body 3, and the bottom of the oil discharge part 13 has a hole having a smaller cross-sectional area than the tubular part. Thereby, the oil separated by the separation unit 9 is stored in the oil discharge part 13. When being stored to a predetermined height, the oil is discharged to the outside against the pressure in the gas flow path 19.

(2) Functions of the Oil Mist Separator

Next, functions of the oil mist separator 1 will be described. The blow-by gas introduced from the gas introduction part 5 into the separator body 3, as shown in FIG. 2, flows through the gas flow path 19 while being meandered by the baffle plates 27. At this time, relatively large oil particle in the mist oil contained in blow-by gas is inertially separated. At the separation unit 9, the blow-by gas passes through the through holes 25 formed in the current plate 21 to increase in rate of flow, and in this state, collides with the collision plate 23. At this time, oil mist inertially collides with the collision plate 23, and adheres to the surface of the collision plate 23. This separates oil from the blow-by gas. Then, the oil adhered to the surface of the collision plate 23 gradually becomes massed together and falls below the collision plate 23. The oil thus separated moves along the surface of the bottom wall 15 of the separator body 3, reaches the oil discharge part 13, and is discharged to the outside of the separator body 3.

Due to, for example, flow of the blow-by gas, or inclination or inertia force during driving of the vehicle, a part of the separated oil may flow downstream of the oil discharge part 13. Such oil is blocked by the dams 11. When the oil blocked by the dam 11 overflows to the downstream side as shown in FIG. 4, the oil overflows in the vicinity of the tip end of the dam 11. Then, the overflown oil is blocked by the subsequent downstream dam 11, and is returned to the upstream side due to, for example, the inclination or inertia force during driving of the vehicle.

(3) Effects of Embodiments

The oil mist separator 1 in accordance with this embodiment includes: a separator body 3 which includes a bottom wall 15 and a pair of side walls 17 erected from sides of the bottom wall 15 and has a gas flow path 19 through which the blow-by gas flows; a gas introduction part 5 configured to introduce the blow-by gas into the separator body 3; a gas discharge part 7 configured to discharge the blow-by gas from the separator body 3; a separation unit 9 provided between the gas introduction part 5 and the gas discharge part 7 in the separator body 3 and configured to separate oil from the blow-by gas; dams 11 provided on the bottom wall 15 of the separator body 3 downstream of the separation unit 9 in the gas flow path 19 and configured to block the oil separated by the separation unit 9 from flowing to the downstream side; and an oil discharge part 13 provided upstream of the dams 11 in the gas flow path 19 and configured to discharge the oil separated by the separation unit 9 from the separator body 3. The dams 11 are formed along the gas flow path 19 so as to alternately extend from the pair of side walls 17.

With such configuration, even when the oil blocked by any dam 11 overflows from the dam 11, the oil can be blocked by the subsequent downstream dam 11. As a result, the separated oil can be prevented from moving along the surface of the bottom wall 15 and flowing to the gas outlet. Since the dams 11 extend such that tip ends of the dams 11 are located beyond a center of the gas flow path 19 in a width direction and upstream of the base ends of the dams 11, the oil blocking function of the dams 11 can be effectively achieved. Further, the dams 11 can suppress the blow-by gas from flowing in the vicinity of the bottom wall 15 of the separator body 3, thereby preventing oil from being brought to the downstream side by flowing blow-by gas.

Since an upper end surface of each of the dams 11 is inclined downward from the base end toward the tip end, the flow rate of the blow-by gas in the center of the gas flow path 19 in the width direction can be ensured. Further, the blocked oil can be prevented from overflowing from the base end of the dam 11, and can be overflown from the vicinity of the tip end of the dam 11. Thereby, the overflown oil can be reliably blocked by the subsequent downstream dam 11. In the case where the oil mist separator 1 is inclined to be lower toward the downstream side of the gas flow path 19, or an inertia force in the downstream direction of the gas flow path 19 occurs, since the tip ends of the dams 11 are located upstream of the base ends of the dams 11, the blocking capacity of the dams 11 can be ensured as in the case where the height of the tip ends of the dams 11 is the same as that of the base ends of the dams 11. Therefore, the oil mist separator can ensure both the flow rate of the blow-by gas and the oil blocking capacity.

Since the dam 11 located on the most downstream side among the plurality of dams 11 has the hook-like tip end extending in the upstream direction of the gas flow path 19, the oil blocking volume of the dam 11 can be made larger than the oil blocking volume of the other dams 11.

Among the plurality of baffle plates 27, the baffle plates 27 extending from the bottom wall 15 are connected to the separator body 3 only at the bottom wall 15, with a distance from both the side walls 17. This can prevent the oil separated by the baffle plates 27 from accumulating between the baffle plates 27 extending from the bottom wall 15. In contrast, among the plurality of baffle plates 27, the baffle plates 27 extending from the ceiling wall 29 are connected to the separator body 3 at the ceiling wall 29 and both the side walls 17 and therefore, blow-by gas that collides with the baffle plates 27 extending from the ceiling wall 29 can be reliably brought to the bottom wall 15.

The present invention is not limited to the embodiment, and may be variously modified within the scope of the present invention according to objects and applications. That is, although the upper end surface of each of the dams 11 is inclined downward from the base end toward the tip end in the embodiment, the present invention is not limited thereto; for example, the upper end surface of the dam may have the same height from the base end to the tip end.

Figure 6:
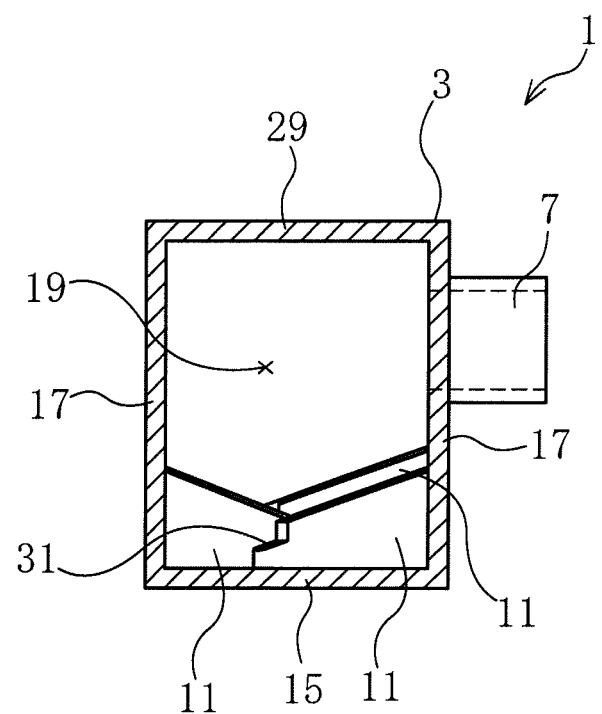
FIG. 6 is a view for describing an oil mist separator in accordance with another embodiment.

As shown in FIG. 6, the upper end surface of the tip end of the dam 11 may have a notch 31. By forming the notch 31, the position at which oil overflows from the dam can be set to the position of the notch 31 located at the tip end of the dam 11. This can more reliably block overflown oil at the subsequent downstream dam 11, effectively suppressing the oil from flowing to the gas discharge part 7.

As shown in FIG. 5, an oil storage part 33 may be formed at one end of the separator body 3 near the gas discharge part 7. Oil that moves along the surface of the bottom wall 15 of the separator body 3 and reaches the vicinity of the gas discharge part 7 can be stored in the oil storage part 33. As a result, separated oil can be suppressed from flowing out of the gas discharge part.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above-described embodiments, and various variations and modifications may be possible without departing from the scope of the present invention.

INDUSTRIAL APPLICABILITY

The present invention is widely used as the technique of separating mist oil contained in blow-by gas from the internal combustion engine.

DESCRIPTION OF REFERENCE NUMERALS

1: oil mist separator; 3: separator body; 5: gas introduction part; 7: gas discharge part; 9: separation unit; 11: dam; 13: oil discharge part; 15: bottom wall; 17: side wall; 19: gas flow path; 21: current plate; 23: collision plate; 25: through hole; 27: baffle plate; 29: ceiling wall; 31: notch and 33: oil storage part.

The invention claimed is:

1. An oil mist separator for separating mist oil contained in blow-by gas from an internal combustion engine, the oil mist separator comprising:
　a separator body which includes a bottom wall and a pair of side walls erected from sides of the bottom wall and has a gas flow path through which the blow-by gas flows;
　a gas introduction part configured to introduce the blow-by gas into the separator body;
　a gas discharge part configured to discharge the blow-by gas from the separator body;
　a separation unit provided between the gas introduction part and the gas discharge part in the separator body and configured to separate oil from the blow-by gas;
　dams provided on the bottom wall of the separator body downstream of the separation unit in the gas flow path and configured to block the oil separated by the separation unit from flowing to the downstream side; and
　an oil discharge part provided upstream of the dams in the gas flow path and configured to discharge the oil separated by the separation unit from the separator body, wherein
　the dams are formed along the gas flow path so as to alternately extend from the pair of side walls, and
　the dams extend such that tip ends of the dams are located beyond a center of the gas flow path in a width direction and upstream of base ends of the dams.

2. The oil mist separator according to claim 1, wherein an upper end surface of each of the dams is inclined downward from the base end toward the tip end.

3. The oil mist separator according to claim 1, wherein an upper end surface of the tip end has a notch.

4. The oil mist separator according to claim 1, wherein an oil storage part is formed at one end of the separator body near the gas discharge part.

5. The oil mist separator according to claim 2, wherein an upper end surface of the tip end has a notch.

6. The oil mist separator according to claim 2, wherein an oil storage part is formed at one end of the separator body near the gas discharge part.

7. The oil mist separator according to claim 3, wherein an oil storage part is formed at one end of the separator body near the gas discharge part.

8. The oil mist separator according to claim 5, wherein an oil storage part is formed at one end of the separator body near the gas discharge part.

9. The oil mist separator according to claim 1, wherein the tip ends of the adjacent dams are opposed each other in a gas flow direction along the gas flow path.

10. The oil mist separator according to claim 1, wherein the oil discharge part is provided on the bottom wall of the separator body between the separation unit and the dams.

* * * * *